Figure 1:
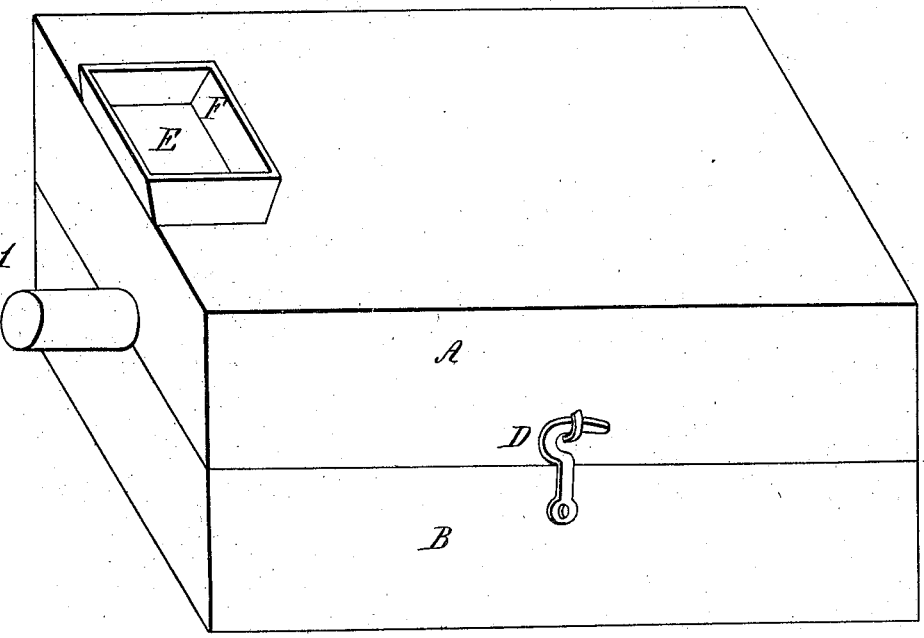

F. Wohfersberger.

Meat Cutter.

Nº 19,728. Patented Mar. 23, 1858.

UNITED STATES PATENT OFFICE.

FREDERICK WOBFERSBERGER, OF SALEM STATION, OHIO.

IMPROVEMENT IN MEAT-CUTTING MACHINES.

Specification forming part of Letters Patent No. 19,728, dated March 23, 1858.

*To all whom it may concern:*

Be it known that I, FREDERICK WOBFERSBERGER, of Salem Station, in the county of Richland and State of Ohio, have invented certain new and useful Improvements in Machines for Cutting Meat and Vegetables; and I do hereby declare that the same are described and represented in the following specification and drawings.

To enable others skilled in the art to make and use my improvements, I will proceed to describe their construction and operation, referring to the drawings, in which the same letters indicate like parts in each of the figures.

Figure 2:
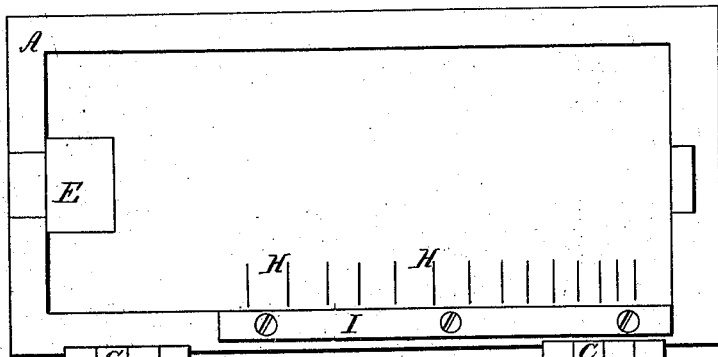

Figure 1 is an isometrical view of a machine with my improvements. Fig. 2 is a plan of the same with the top turned back.

The nature of my invention and improvements in machines for cutting meat and vegetables consists in arranging some plates spirally between the pins on the roller to carry the meat or vegetables forward as they are cut in the machine.

Figure 3:
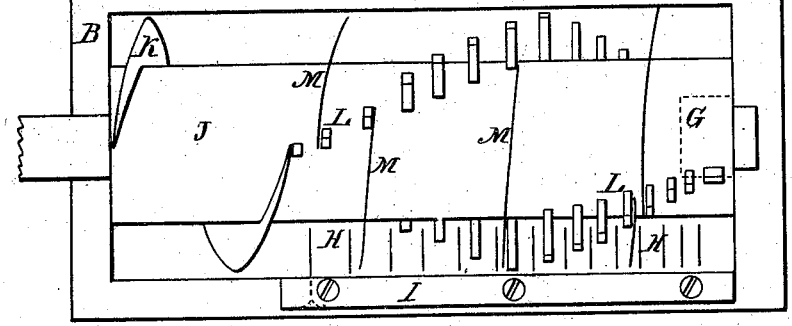
Figure 3:
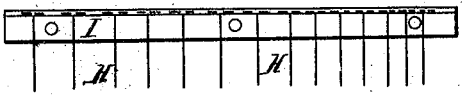

In the accompanying drawings, A is the top and B the bottom of the machine, connected together by the hinges C C, so that it can be readily opened and closed and fastened by the hook D. There is a semicircular cavity A in the top, with an opening E, through which the meat is supplied from the hopper F on the top of the machine. There is also a similar semicircular cavity B in the bottom, with an opening G, (at the opposite end from the opening E,) shown in dotted lines in Fig. 2, for the meat to escape after it is cut. One edge of each of these cavities A and B is armed with a series of knives H H, constructed as follows: A rabbet is cut in the edge of the cavity to receive the knife-stock I, which is fitted to it, so as to be fastened by screws or otherwise. After the knife-stock has been fitted to its place it may be taken out and scored and the knives fitted into the under side of it, as shown in Fig. 3, which is a representation of the under side of the knife-stock I with the knives inserted in it. The rear ends of the knives are bent over at a right angle, as shown in Fig. 4, which is a plan and elevation of a knife, so that when the knife-stock is fastened in its place in the machine the ends of the knives so bent over come between the stock and the side of the rabbet so as to clamp them and hold them tight in their proper places. At the same time they can be easily released by taking out the stock for the purpose of sharpening or supplying new ones in the places of those which have been broken. By bending the ends of the knives over and clamping them, as above mentioned, they are held very securely, so that they cannot slip either forward or backward or move sidewise so as to come in contact with the moving parts of the machine.

J is a roller with a journal at each end, fitted to turn in boxes at each end of the top and bottom, as shown in the drawings. One of these journals extends out far enough to receive a pulley-gear or crank, by which it may be turned to cut the meat or vegetables put into the machine. That portion of the roller J which is under the opening E is armed with a piece of sheet metal K, set spirally to convey the meat put in at E to the knives H H. Opposite these knives the roller J is armed with two rows of square pins L L, set spirally in opposite sides of the roller, so as to pass between the knives H H and press the meat through between the knives as it is cut by them and carry it round from one series of knives to the other; and in order to carry the meat forward to the rear end of the machine as it is cut there are some semicircular segments of sheet metal M M extending half-way around the cylinder and set spirally from the front side of one pin to the rear side of the next, as shown in the drawings, to propel the meat forward as it is cut, the knives being set gradually nearer to one another as they approach the rear end of the machine, so as to cut the meat gradually finer as it passes along until it escapes from the hole in the bottom, where it passes out of the machine.

The great defect in the machines heretofore made for cutting meat has been the want of some device to propel the meat forward and prevent it from continuing to pass directly around the cylinder without moving forward in the machine. This defect is completely obviated by the segments M M, set spirally from the front side of a pin to the rear side of the next pin on the opposite side of the roller, so as to propel the meat forward to the rear of the machine and prevent it from passing or continuing to pass directly around the roller. By constantly propelling the meat forward it is cut much faster and finer and is mashed and mangled less and leaves the machine in far better order, while at the same time the machine does double the quantity of work in a given time.

I believe I have described and represented my improvements in machines for cutting meat and vegetables so as to enable any person skilled in the art to make and use them.

I will now state what I desire to secure by Letters Patent, to wit:

The segment plates arranged spirally on the roller between the pins, in combination with the knives H, substantially as described.

FREDERICK WOBFERSBERGER.

Witnesses:
   JOHN FERRELL,
   THOS. BOORMAN.